Aug. 23, 1960     L. FROME     2,950,426
CAPACITOR FOR CONDUCTIVE LIQUIDS
Filed June 26, 1956
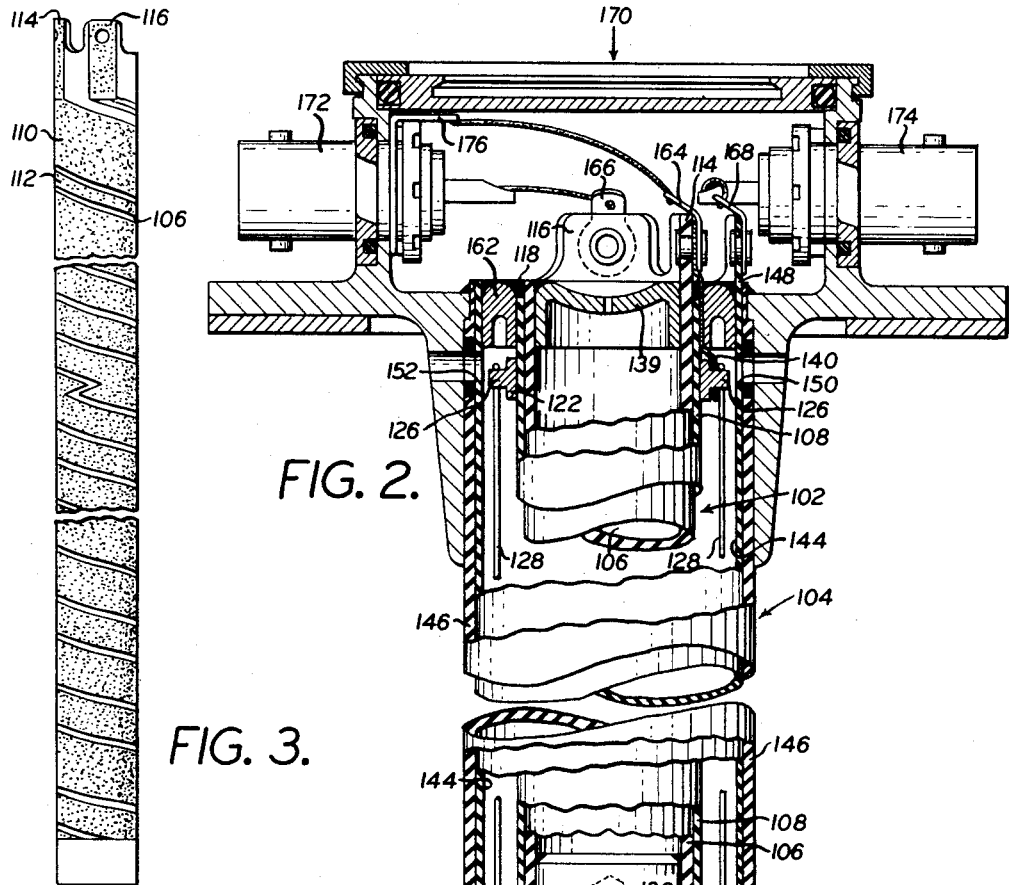
FIG. 2.
FIG. 3.
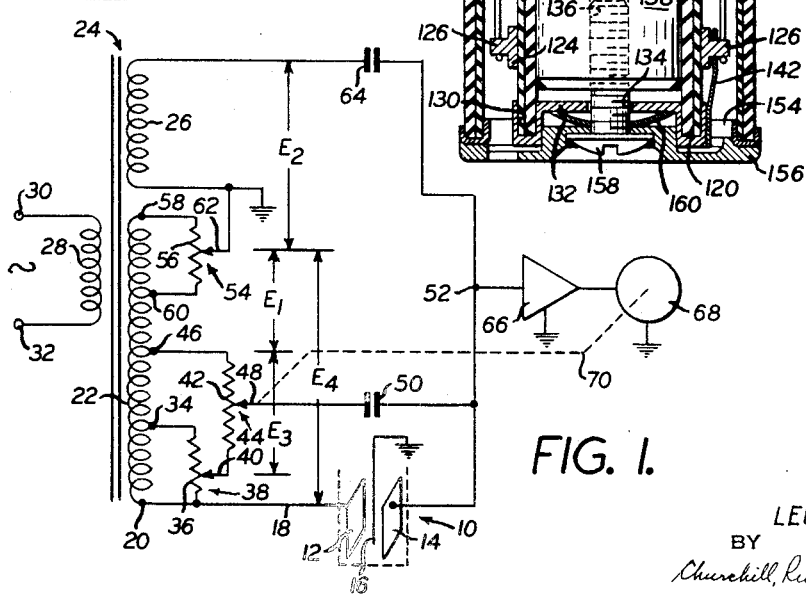
FIG. 1.
INVENTOR
LEONARD FROME
BY
Churchill, Rich, Weymouth & Engel
ATTORNEYS.

United States Patent Office 2,950,426
Patented Aug. 23, 1960

2,950,426

CAPACITOR FOR CONDUCTIVE LIQUIDS

Leonard Frome, New York, N.Y., assignor to Simmonds Precision Products, Inc., Tarrytown, N.Y., a corporation of New York Filed June 26, 1956, Ser. No. 594,048

9 Claims. (Cl. 317—246)

The present invention relates to a measuring condenser for use in a contents gauge for electrically conductive liquids. More particularly, the invention relates to a measuring condenser of the type having a pair of spaced structures each including an electrode surrounded by insulation and adapted for immersion in the liquid to be gauged such that the capacity between the electrodes is a function of the quantity of liquid therebetween.

The literature relating to the use of condensers for measuring the quantity of a liquid in a container contains numerous remarks concerning the use of such condensers in connection with electrically conductive liquids. It has been universally recognized that the electrodes which form the plates of the condenser must be insulated from the liquid. The expedient most often suggested involves coating them with an insulating paint or varnish or the like. As a practical matter, however, it has been found extremely difficult, if not impossible, to apply such coating so as to afford uniform and complete insulation over the entire area of the electrode during operation of the condenser.

The preferred circuit arrangement in use today for gauging nonconductive liquids takes the form of an automatically rebalancing electrical bridge. If the measuring condenser in such circuit is modified by applying insulation to its electrodes, it will be found that as the thickness of the insulation is increased, the sensitivity of the system will be decreased. Thus, the two requirements for sensitivity and uniform insulation are in direct conflict. This result is highly undesirable. Fortunately, a modified form of bridge circuit has been discovered which will operate with increased sensitivity as the insulation thickness is increased.

In accordance with the present invention a condenser is provided wherein at least one of its electrode structures comprises a pair of concentric self-supporting tubular elements of insulating material, the inner tubular element fitting within the outer tubular element with a snug fit, and a conductive metallic layer of microscopic thickness adhered to one of the mating surfaces of said pair of tubular elements. In this manner preformed structures of insulating material which are readily machineable to required dimensions for satisfactory insulation can be employed.

In the known gauges intended for use with nonconductive liquids, the presence of liquid between the electrodes of the condenser acts to increase the capacity thereof. However, the system upon which the present invention is based relies upon the concept of utilizing the liquid as an electrostatic shield between the condenser electrodes rather than as a dielectric. For this purpose, in accordance with a further feature of the present invention, the measuring condenser is provided with a third or auxiliary electrode free of insulation for making conductive contact with the liquid whenever liquid occupies the space between the insulated electrodes. If the auxiliary electrode is connected to a suitable point in the measuring circuit, as will be more fully described in the detailed description to follow, the liquid will serve as a conductive medium for diverting the electrostatic field from between the principal or main electrodes of the condenser and, thus, will reduce the capacity of the condenser from some initial value when it is empty down substantially to zero when it is full. In this connection the present invention avoids the introduction of power factor errors due to the resistivity of the liquids being gauged and the variations therein by arranging the above-mentioned third electrode to extend throughout the height of the condenser.

The present invention will be better understood as well as its many objects and advantages after reading the following detailed description in connection with the appended drawings in which:

Fig. 1 is a schematic circuit diagram showing the modified form of rebalancing bridge employed with a condenser embodying the present invention;

Fig. 2 is a partially cut away, partially sectionalized vertical elevation of the contents gauge condenser constructed in accordance with the present invention; and Fig. 3 is a detailed rear view of the inner tube and its electrode layers forming a part of the inner insulated electrode of Fig. 2.

Before describing the detailed construction of the condenser forming the subject of the present invention, it will be helpful to have an understanding of the operation of a typical circuit with which it may be employed. Reference should be had to Fig. 1 wherein the measuring condenser, which is shown schematically, is designated by the reference character 10. The condenser 10 is provided with a pair of spaced insulated electrodes or structures 12 and 14 and with a non-insulated wire-like electrode 16. The electrode 12 is connected by a lead 18 to an end terminal 20 of the secondary winding 22 of a transformer 24. The transformer 24 is provided with another secondary winding 26, and with a primary winding 28. The winding 28 is provided with a pair of terminals 30 and 32 for connection to a source of alternating current. Between the terminal 20 of secondary winding 22 and a tap 34 thereon, there is connected the resistance element 36 of a potentiometer 38. The potentiometer 38 is provided with a slider 40 which is connected to one end of the resistance element 42 of a balancing potentiometer 44. The other end of the element 42 is connected to a further tap 46 on the winding 22. The potentiometer 44 is also provided with a slider 48 which is electrically connected through a capacitor 50 of fixed capacity to the output point 52 of the bridge circuit. The second electrode 14 of the measuring condenser 10 is also connected to the output point 52. Another potentiometer 54 has a resistance element 56 connected between the end terminal 58 on the winding 22 and a tap 60 thereon. The potentiometer 54 has a slider 62 which is connected to a point of reference potential, here shown as ground. As shown in the drawing, the secondary winding 26 is connected between ground and one terminal of a fixed condenser 64. The other terminal of the condenser 64 is connected to the output point 52. The wire-like electrode 16 of the condenser 10 is connected to ground as shown. This completes the bridge circuit.

An amplifier 66 has an input connected between the output point 52 and ground. The output from the amplifier 66 is connected to control a motor 68. The motor 68 is in turn mechanically coupled to reposition the slider 48 of the potentiometer 44 as represented diagrammatically by the dashed line 70. The amplifier 66 and motor 68 may take the form of any well known arrangement of its type known in the art.

The operation of the circuit will now be explained. When there is no liquid between the electrodes 12 and 14 of the condenser 10 a predetermined capacity, which will be designated $C_p$, will exist therebetween. The electrode 16 occupies only a small portion of the space included between electrodes 12 and 14 and, therefore, a comparatively negligible capacitance will exist between electrode 16 and each of the electrodes 12 and 14. With the condenser 10 in this condition the potentiometer 54 is adjusted so that the total current through condenser 10 and capacitor 50 will equal and balance the current through the capacitor 64. Assuming that the slider 48 of the rebalancing potentiometer is now at the upper end of the element 42 (as viewed in the drawing) the condition of the circuit will now be represented by the following equation:

$$E_1 C_{50} + E_4 C_p = E_2 C_{64} \qquad (1)$$

wherein the terms $E_1$, $E_2$ and $E_4$ are as shown in Fig. 1 and $C_p$, $C_{50}$ and $C_{64}$ represent the capacities respectively of the condenser 10 when empty, the capacitor 50, and the capacitor 64.

With the space between the electrodes 12 and 14 of the condenser 10 filled with an electrically conductive liquid, the capacity between the electrodes 12 and 14 will be substantially zero. This will be understood when it is considered that the liquid is maintained at ground potential by reason of the electrode 16. Assuming now that the slider 48 is positioned at the lower end of the element 42, the potentiometer 38 can be adjusted to establish balance in the circuit in which case the equation for the network will be as follows:

$$E_1 C_{50} + E_3 C_{50} = E_2 C_{64} \qquad (2)$$

wherein $E_3$ is as shown in the drawing and the remaining terms are as previously noted.

Considering that the measuring condenser 10 is disposed in a tank or container extending between the top and bottom thereof, the above adjustments serve to establish the zero and full readings corresponding to empty and full tank. During operation as the quantity of liquid between the electrodes of the condenser 10 varies, the bridge will be temporarily unbalanced causing the motor 68 to be supplied with an operating signal from the amplifier 66 until the motor restores bridge balance by repositioning the slider 48. It can be shown that the slider 48 will assume a position along the resistance element 42 which corresponds to the height of the liquid between the electrodes of the measuring condenser. This assumes uniform electrode construction. However, if the electrodes 12 and 14 are profiled in order to match the irregularity of a particular tank or container, then the position of the slider 48 will represent liquid volume. It should be apparent that any current flowing between the electrodes 12 and 16 will only load the winding 22 of the transformer but will not affect the bridge output. The flow of current between electrodes 14 and 16 follows a path in parallel with the bridge output and has no affect thereon except for reducing the sensitivity of the amplifier and motor response.

It has been stated that the capacity of condenser 10 when empty is $C_p$ and when full is substantially zero. Thus, the larger the value of $C_p$, the greater the available change in capacity over the operating range, and the greater the sensitivity. The value of $C_p$ can be increased by increasing the amount of high dielectric material existing between the principal electrodes of the condenser. That is, the amount of insulation should be increased. However, a compromise must be reached between sensitivity and the desire or need to keep the weight of the condenser at a minimum.

Referring now to Fig. 2 the insulated electrode structures of the condenser are designated generally by the reference characters 102 and 104. The two structures are in the form of concentric cylinders of novel construction. Considering the structure 102, it consists of a pair of tubular self-supporting elements 106 and 108 which fit snugly one within the other as shown. In the embodiment being described both elements 106 and 108 are cylindrical and are formed of insulating material. The choice of insulating material is dictated by considerations of immunity to attack by the liquid with which the gauge is to be employed and of physical dimensional stability under service conditions. A lightweight construction which has been found satisfactory for use with certain water-hydrocarbon mixtures is one made of roved glass fibers impregnated with epoxy resins.

The details of the innermost tubular element 106 are shown in Fig. 3 to which reference should now be had. Note, however, that Fig. 3 represents a rear view of the particular element. The outer surface of the insulated cylinder 106 is sprayed with a metallic paint or metal-forming mixture for the purpose of providing a conductive layer of microscopic thickness upon its outer surface. As shown in Fig. 3 the metallic layer is divided into two independent spiral or helical portions 110 and 112. Each of the portions 110 and 112 is extended vertically so as to overlie a corresponding upstanding ear 114 and 116, respectively, of the insulated cylinder 106. One of the portions, for example, the portion 112, is the main or active electrode of the condenser. It may be profiled as suggested in the drawing in order to complement the irregularity of the tank or container with which the condenser is to be used. The manner of profiling is believed to be well known in the art. The other portion 110 borders the perimeter of the first portion or layer 112 in spaced relation thereto for suppressing fringing of the electrostatic field at said perimeter. When the condenser using this electrode construction is employed in the circuit of Fig. 1, the electrode portion 110 would be connected through the means to be described to ground. Under certain less exacting conditions the portion 110 may be dispensed with.

Returning to Fig. 2 it is seen that the outer element 108 which surrounds the element 106 and its associated electrode layers is flush with the bottom end of 106 but somewhat shorter at the upper end so as to fully expose the ears 114 and 116. To avoid undue exaggeration the metallic layers have not been shown in Fig. 2. A suitable liquid-proof sealing composition is used to obstruct all openings through which liquid might enter the interface between the tubular elements 106 and 108. In the embodiment illustrated, these openings are at the top at 118 and at the bottom at 120. It should be noted that in each case a suitable channel or the like is provided for the sealing composition. In the case of the opening 120, the bottom end of the outer surface of tube 106 is provided with a chamfer. The channel for the opening 118 is provided by the aforementioned undercutting or foreshortening of the tube 108. In this manner the conductive electrodes (not shown) are sealed between the two interjoined tubular elements 106 and 108.

A pair of mounting rings 122 and 124 are supported co-axially upon the outer tubular element 108 respectively above and below the limits of the metallic electrode portions 110 and 112. It will be noticed from Fig. 3 that these portions stop short of the opposite ends of the supporting tube. Each of the rings 122 and 124 is provided with a plurality of radially projecting mounting studs 126 at spaced intervals around the periphery thereof. The studs on the two rings are vertically aligned and bare conductive wires 128, 128 are strung between the corresponding studs on each. The plurality of bare wires which are electrically interconnected by the rings 122 and 124 constitute the third electrode for the condenser.

The lower end of the interjoined tubular elements 106 and 108 is recessed in a channel 130 of a cap or end plate 132. The end plate 132 is provided with a central aperture 134 through which access may be had to the threaded bore 136 in an insulated plug or anchor 138. The plug 138 is cemented in place within the tubular element 106. The upper end of the tubular structure may be provided with a plug 139, as shown.

In order to connect the third electrode to the ground point in the measuring circuit a metallic strap 140 is secured to the upper mounting ring 122 by soldering or the like at a point chosen such that the strap might overlie the ear 114. As previously stated the ear 114 serves as the means for connecting the electrode portion 110 to ground. Thus a common terminal or connecting point may be employed for both the portion 110 of the metallic layer and for the third electrode. The lower mounting ring 124 has a similar strap 142 secured to it by soldering or the like for establishing electrical connection to the end plate 132. Thus the plate 132 may serve as a ground plate.

The outer insulated electrode structure 104 of the condenser is similarly constructed. It has an inner insulated tubular element 144 upon whose outer surface may be provided the second main or active electrode of the condenser in the form of a metallic layer of microscopic thickness not shown in Fig. 2. An outer tubular element 146 surrounds the element 144 and its associated electrode (not shown) with a snug fit. The tubular element 144 is provided with an upstanding ear 148 which is covered by an extension of the metallic layer in a manner similar to that shown in Fig. 3. The elements 144 and 146 are joined together by a suitable sealing composition at all places where liquid might enter the space between them. This includes the marginal areas of the apertures 150 and 152 which serve as vent holes for the air or other medium which is displaced by the liquid during operation. It should be noted that adequate purchase for the sealing composition is provided by cutting back the opening in the outer element 146 which is in registration with the opening in the inner element 144. The ledge provided is then filled with the composition. A channeled annulus 154 caps the lower end of the electrode structure 104.

The lower end of the two structures 102 and 104 are maintained in concentric relationship by means of a perforated end cap 156. The end cap 156 is secured in place by a screw fastening member 158 engaged in the threaded bore 136 of the plug 138. A curved or dished spring washer 160 is interposed between the cap 156 and the end plate 132. This introduces some leeway during assembly to insure intimate contact between the marginal area of the cap 156 and the annulus 154 of the outer electrode structure. The end cap 156 also serves as an electrical connection to the element 154.

The upper ends of the electrode structures 102 and 104 are maintained in concentric relationship by an insulating ring or annulus 162. The ring 162 is cemented to both structures 102 and 104 for sealing the terminal area from the space between the two electrode structures.

Connecting lugs 164, 166 and 168 are located so as to overlie the respective metallic layers and are joined to the corresponding ears 114, 116 and 148, respectively, by any suitable fastening means such as a grommet or the like. The individual lugs may then be connected by suitable wires to corresponding binding posts supported in the top cap and mounting flange assembly 170. Thus, the terminal post 172 would be connected to the point 52 in Fig. 1; the terminal post 174 would be connected to the lead 18 in Fig. 1; and the ground lug 176 would be connected through suitable ground connections to circuit ground in Fig. 1.

Throughout the description it has been assumed that the electrode layers are adhered to the outer surface of the inner tubular element of each insulated electrode structure. This is preferred because of convenience. However, it is equally effective to locate the layers on the inner surface of the outer tubular element of each structure.

The invention has been described with reference to a preferred construction embodying its principles; however, various modifications and changes will occur to one skilled in the art falling within the scope of the appended claims.

What I claim is:

1. A measuring condenser for use in a contents gauge for electrically conductive liquids in an irregularly shaped container of the type having a pair of spaced insulated electrodes adapted for immersion in the liquid to be gauged such that the liquid enters the space between said electrodes to modify the capacity between said electrodes as a function of the quantity of liquid therebetween, one of said electrodes being profiled along the operative length thereof so as to complement the irregularity of said container, comprising, in combination with the pair of insulated electrodes, a thrid electrode free of insulation for making conductive contact with the liquid whenever liquid occupies the space between said pair of insulated electrodes, and means for making external electrical connections to each of said electrodes, whereby the said third electrode, when suitably energized relative to said insulated electrodes, coacts with the liquid to reduce the capacity between said insulated electrodes as a function of the quantity of liquid therebetween.

2. A measuring condenser for use in a contents gauge for electrically conductive liquids comprising a pair of concentrically arranged spaced insulated electrode structures adapted for immersion in the liquid to be gauged such that the liquid enters the space between said structures to modify the capacity therebetween, a first and second mounting ring supported coaxially upon the innermost structure respectively above and below the operating limits of the structure, a plurality of bare wire-like elements strung between said mounting rings for making conductive contact with the liquid, and means for making external electrical connections to the electrodes of said insulated electrode structures and to at least one of said mounting rings.

3. A measuring condenser for use in a contents gauge for electrically conductive liquids comprising an outer cylindrical electrode structure and an inner cylindrical electrode structure disposed concentrically within said outer structure; said inner structure comprising a pair of concentric self-supporting tubular elements of insulating material, the inner tubular element fitting within the outer tubular element with a snug fit, a conductive metallic layer of microscopic thickness adhered to one of the mating surfaces of said pair of tubular elements and extending over the operative length of the electrode structure, means joining said tubular elements together for sealing said layer between said eleemnts, a first and second mounting ring supported co-axialy upon said outer tubular element respectively above and below the operating limits of the electrode structure, a plurality of conductive bare wire-like elements strung between said mounting rings for making conductive contact with the liquid being gauged, and means for making external electrical connection to said wire-like elements and to said metallic layer.

4. A measuring condenser for use in a contents gauge for electrically conductive liquids of the type having a pair of spaced insulated electrodes adapted for immersion in the liquid to be gauged such that the liquid enters the space between said electrodes to modify the capacity therebetween, comprising, in combination with the pair of insulated electrodes, a third electrode free of insulation disposed between said insulated electrodes and extending uniformly throughout at least the operative length of said pair of insulated electrodes for making conductive contact with the liquid whenever liquid occupies the space between said pair of insulated electrodes, and means for making an external electrical connection to said third electrode whereby said third electrode when suitably energized relative to said pair of electrodes coacts with the liquid to reduce the capacity between said pair of electrodes as a function of the quantity of liquid therebetween.

5. A measuring condenser according to claim 4, wherein said third electrode comprises a plurality of bare wires occupying a small percentage of the space between said pair of insulated electrodes so as to have negligible direct effect upon the capacity therebetween.

6. A measuring condenser for electrically conductive liquids for use in a contents gauge system in which the condenser has a pair of spaced insulated electrodes adapted for immersion in the liquid to be gauged such that the liquid enters the space therebetween and such insulated electrodes are connected across a utilization device and a source of current in series, comprising in combination a third electrode free of insulation and disposed for making conductive contact with the liquid whenever liquid occupies the space between said pair of insulated electrodes, said free electrode having little or no effect by itself upon the capacity normally existing between said insulated electrodes when free of said liquid, and means for connecting said third electrode to the junction between said utilization device and said source of current whereby rise of said liquid between said insulated electrodes by-passes current around said utilization device to decrease the current flowing therethrough as a function of the quantity of liquid therebetween.

7. A measuring condenser for use in a contents gauge for electrically conductive liquids in an irregularly shaped container of the type having a pair of spaced insulated electrodes adapted for immersion in the liquid to be gauged such that the liquid enters the space between said electrodes to modify the capacity between said electrodes as a function of the quantity of liquid therebetween, one of said electrodes being profiled along the operative length thereof so as to complement the irregularity of said container, comprising, in combination with the pair of insulated electrodes, a third electrode free of insulation disposed between said insulated electrodes and extending uniformly throughout at least the operative length of said pair of insulated electrodes for making conductive contact with the liquid whenever the liquid occupies the space between said pair of insulated electrodes, and means for making external electrical connections to each of said electrodes, whereby said third electrode when suitably energized relative to said insulated electrodes coacts with the liquid to reduce the capacity between said insulated electrodes as a function of the quantity of liquid therebetween.

8. A measuring condenser for use in a contents gauge for electrically conductive liquids comprising a pair of concentrically arranged spaced insulated electrode structures adapted for immersion in the liquid to be gauged such that the liquid enters the space between said structures to modify the capacity therebetween, a first and second mounting ring supported coaxially upon one of the structures respectively above and below the operating limits of the structure, a plurality of bare wire-like elements strung between said mounting rings for making conductive contact with the liquid, and means for making external electrical connections to the electrodes of said insulated electrode structures and to said wire-like elements.

9. A measuring condenser for use in a contents gauge for electrically conductive liquids in an irregularly shaped container comprising a pair of concentrically arranged spaced insulated electrode structures adapted for immersion in the liquid to be gauged such that the liquid enters the space between said structures to modify the capacity therebetween; one of said structures including a first electrode profiled along the operative length of the structure so as to complement the irregularity of said container, and a second electrode bordering the perimeter of said first electrode in spaced relation thereto for suppressing fringing of the electrostatic field at said perimeter; a first and second mounting ring supported coaxially upon the innermost structure respectively above and below the operating limits of the structure; a plurality of bare wire-like elements strung between said mounting rings for making conductive contact with the liquid; means forming an electrical connection between one of said mounting rings and said second electrode; and separate means for making separate external electrical connections to said first and second electrodes, respectively, and to the electrode of the other electrode structure.

References Cited in the file of this patent

UNITED STATES PATENTS

| | | |
|---|---|---|
| 1,873,236 | Wheeler | Aug. 23, 1932 |
| 2,529,015 | Levkovitsch et al. | Nov. 7, 1950 |
| 2,581,085 | Edelman | Jan. 1, 1952 |
| 2,699,523 | Meyers | Jan. 11, 1955 |
| 2,718,620 | Howe | Sept. 20, 1955 |
| 2,741,124 | Meyers | Apr. 10, 1956 |
| 2,752,543 | Smith | June 26, 1956 |
| 2,754,478 | Goldsmith | July 10, 1956 |

FOREIGN PATENTS

| | | |
|---|---|---|
| 458,710 | Great Britain | Dec. 24, 1936 |
| 938,646 | France | Apr. 12, 1948 |
| 1,035,712 | France | Apr. 22, 1953 |